United States Patent [19]

Whittemore et al.

[11] Patent Number: 6,042,742
[45] Date of Patent: Mar. 28, 2000

[54] COMPOSITION AND METHOD FOR INHIBITING CHLORIDE-INDUCED CORROSION OF AND LIMESCALE FORMATION ON FERROUS METALS AND ALLOYS

[76] Inventors: Michael Whittemore; Gerald LaCosse; Jennifer Riley, all c/o Kay Chemical Company, P.O. Box 18407, Greensboro, N.C. 27419

[21] Appl. No.: 08/466,060

[22] Filed: Jun. 6, 1995

Related U.S. Application Data

[63] Continuation-in-part of application No. 08/320,149, Oct. 7, 1994, abandoned.

[51] Int. Cl.$^7$ .................................. C02F 5/10; C02F 1/00
[52] U.S. Cl. ............................................ 252/180; 210/698
[58] Field of Search ........................... 252/180; 510/247; 210/698

[56] References Cited

U.S. PATENT DOCUMENTS

| | | | |
|---|---|---|---|
| 3,072,502 | 1/1963 | Alfano | 134/3 |
| 3,635,826 | 1/1972 | Hamilton | 252/79.4 |
| 3,696,044 | 10/1972 | Rutledge | 252/180 |
| 3,705,109 | 12/1972 | Hausler et al. | 252/392 |
| 4,032,460 | 6/1977 | Zilch et al. | 252/8.55 B |
| 4,120,655 | 10/1978 | Crambes et al. | 422/15 |
| 4,138,353 | 2/1979 | Lipinski | 252/181 |
| 4,470,951 | 9/1984 | Bradbury et al. | 376/310 |
| 4,661,261 | 4/1987 | Chambers | 210/698 |
| 4,705,573 | 11/1987 | Wood et al. | 134/3 |
| 4,731,124 | 3/1988 | Bradbury et al. | 134/3 |
| 4,855,069 | 8/1989 | Schuppiser et al. | 252/181 |
| 4,869,841 | 9/1989 | Matteodo et al. | 252/79 |
| 4,885,136 | 12/1989 | Katayama et al. | 252/389.2 |
| 4,927,550 | 5/1990 | Cutcher | 252/32.5 |
| 5,015,298 | 5/1991 | Arrington | 134/2 |
| 5,401,311 | 3/1995 | Freese | 134/2 |

FOREIGN PATENT DOCUMENTS

| | | |
|---|---|---|
| 0060224 | 9/1982 | European Pat. Off. |
| 4-283299 | 10/1992 | Japan |
| 4283299 | 10/1992 | Japan |

OTHER PUBLICATIONS

Working Data—Carpenter Stainless Steels 104–114 (Carpenter Technology Corp. 1973). Month unknown.

Perry's Chemical Engineers' Handbook 23:3–9 (6th Ed. 1984).

The Nalco Water Handbook 20:1–12 (2d Ed. 1988).

Metals Handbook 13:108–14, 142–63, 494–97, 547–65 (9th Ed. ASM Int'l. 1987).

International Search Report from PCT Application No. PCT/US95/12479.

Form PTO–892 Notice of References Cited from Serial No. 08/320,149.

*Primary Examiner*—Jacqueline V. Howard
*Assistant Examiner*—Cephia D. Toomer
*Attorney, Agent, or Firm*—Finnegan, Henderson, Farabow, Garrett & Dunner, L.L.P.

[57] ABSTRACT

The present invention relates to a composition and method for inhibiting chloride-induced corrosion of and limescale formation on ferrous metals and alloys which contact aqueous solutions, the composition containing a corrosion inhibiting amount of at least one polycarboxylic acid and/or its alkali metal or alkaline earth metal salts and a sufficient amount of a base to bring the aqueous solution to a pH effective to inhibit both chloride-induced corrosion and limescale formation.

9 Claims, No Drawings

6,042,742

COMPOSITION AND METHOD FOR INHIBITING CHLORIDE-INDUCED CORROSION OF AND LIMESCALE FORMATION ON FERROUS METALS AND ALLOYS

This Application is a CIP of application Ser. No. 08/320,149, filed Oct. 7, 1994, now abandoned.

BACKGROUND OF THE INVENTION

The present invention relates to a composition and method for inhibiting limescale formation on and chloride-induced corrosion of a ferrous metal or alloy which contacts an aqueous solution, even solutions of high hardness and high chloride content. As used in the present specification, the term "aqueous solution" refers to an ion-containing solution which is primarily composed of water, such as tapwater or saltwater or the like. As used in the present specification, the term "aqueous solution" includes solids (i.e., frozen solutions such as ice), liquids, or gases (i.e., heated solutions such as steam), or mixtures thereof.

Significant problems exist for systems in which aqueous solutions become concentrated, such as flash heating systems in which feedwater is vaporized by contact with a heat transfer surface. Examples of such flash heating systems include the food storage cabinets used by the quick service restaurant industry, in which water is flash evaporated by contact with a metal heat transfer surface to provide a hot, humid environment for temporary food storage. Problems associated with these systems include chloride-induced corrosion and environmentally-induced cracking, such as corrosion fatigue and stress-corrosion cracking, in systems constructed of ferrous metals and alloys, such as austenitic stainless steels and carbon steels.

Austenitic stainless steels and the like are generally resistant to the corrosive action of most environments due to the formation of a passive oxide film on the surface of the metal. Halides in general and chlorides in particular, however, readily promote localized pitting corrosion of austenitic steels by penetrating this passive oxide film at discrete sites, causing these sites to become electrochemically active compared to the surrounding passive metal. The resulting electrolytic cell causes a corrosion reaction to occur, resulting in localized loss of metal at the anodic (active) site. As the corrosion advances, the continued loss of metal produces a pit in the surface. Once a pit is formed, the local chemical environment within the pit becomes significantly more aggressive than that of the bulk aqueous solution, further driving the corrosion reaction at that site and thus increasing the depth of the pit. While the relative loss of mass caused by pitting corrosion is quite low compared to that caused by generalized corrosion, pitting attack can rapidly cause potentially hazardous failure of metal parts, as the formation of pits severely degrades the structural integrity of the metal body. Indeed, localized corrosion, such as chloride-induced pitting, is responsible for an estimated 90% of metal damage caused by corrosion in the chemical-processing industries.

Pits and other surface irregularities may also serve as initiation sites for other damaging corrosive processes, particularly those involving cracking of the metal. Stress-corrosion cracking ("SCC") is a type of failure in which static tensile stresses, which may be residual or applied, combine synergistically with a chemically aggressive environment to initiate and propagate the formation of cracks within the metal. As the stresses required for SCC are usually much lower than the yield stress of the metal, SCC can cause failure of metal parts held under seemingly acceptable stress levels. A similar cracking process known as corrosion fatigue results from a combination of corrosive environment and cyclic applied stress, such as that produced by the repeated heating and cooling of a metal surface. As with SCC, stress and environment act synergistically to cause cracking of the metal which would not occur in the absence of either factor. Corrosion fatigue can greatly shorten the effective service life of cyclically-loaded metal parts exposed to an aggressive environment.

Pitting and the concomitant environmentally-induced cracking of ferrous metals and alloys can occur in systems using water having only nominal chloride concentrations, possibly as low as 10 parts per million. This is a particular problem in flash heating systems, as the instantaneous vaporization of the feedwater on the heat transfer surface tends to concentrate the chloride ions on that surface and thus creates localized areas of high chloride concentration.

An additional factor contributing to the problems of pitting and environmentally-induced cracking is the formation of scale deposits, particularly on heat transfer surfaces. The most common of these deposits, limescale, typically consists of 90–95% calcium carbonate ($CaCO_3$) and 5–10% of magnesium carbonate ($MgCO_3$). The solubility of these calcium and magnesium carbonate salts in the feedwater decreases as the temperature of the feedwater increases. Consequently, flash evaporation of even low hardness water can cause significant limescale deposition on heat transfer surfaces.

Limescale deposits contribute to localized corrosion by preventing oxygen from migrating to the metal surface underneath a deposit. This creates an oxygen differential cell in which the surface beneath the deposit is anodic relative to the surrounding metal. The resulting corrosion reaction causes localized metal loss at the anode, as well as a buildup of corrosion products beneath the deposit. Through various mechanisms, these corrosion products act to increase the aggressiveness of the local environment of the anode, further promoting localized corrosion. Scale also acts as an insulator, requiring increased metal temperatures to achieve the same heat transfer rates across a portion of scaled metal. In flash vaporization systems, these higher temperatures increase the magnitude of the stress cycle created by the constant heating and cooling of the heat transfer surface, thus further promoting corrosion fatigue of that surface.

In order to overcome these problems, one approach has been pretreatment or conditioning of the feedwater in an effort to reduce the concentrations of deleterious ions. Several methods have been developed to accomplish this reduction, including the use of reverse-osmosis and ion-exchange filtration units. These methods, however, while providing significant reductions in the ion content of the feedwater, cannot completely remove all of the deleterious ions from the feedwater. Consequently, these methods slow development of corrosion and scale but cannot completely eliminate their formation. Additionally, the use of high purity feedwater may not be economically feasible, or even practical, for some processes.

An alternative approach to reducing corrosion involves the addition of corrosion inhibitors to the feedwater. These corrosion inhibitors are generally classified according to which half of the corrosion reaction they inhibit.

More specifically, anodic inhibitors prevent the migration of metal ions from the metal surface into the water, thus inhibiting the anodic half of the reaction. Anodic inhibitors typically act by initiating or promoting the formation of an oxide film on the metal surface. These inhibitors, however, are usually sensitive to the pH and chloride ion concentration of the feedwater, and generally have a critical minimum concentration, below which the inhibitor will actually facilitate localized corrosion. Because of this problem, frequent monitoring of inhibitor level is generally required when using anodic inhibitors. Additionally, many anodic inhibitors are undesirable because of toxicity and other environmental concerns. Examples of typical anodic inhibitors include chromates, nitrites, molybdates and phosphates. These inhibitors may be used individually or in combination with one another or even together with cathodic inhibitors.

Unlike anodic inhibitors, cathodic inhibitors affect the cathodic half of the corrosion reaction, which is typically the reduction of oxygen to form hydroxyl ions. Cathodic inhibitors typically act by producing complexes that migrate to areas of locally elevated pH, forming barriers that isolate the cathode from the aqueous solution. Cathodic inhibitors are generally less effective corrosion inhibitors than anodic inhibitors. Additionally, some cathodic inhibitors exhibit poor hydrolytic stability and may thus degrade to scale-forming ions under certain conditions. The performance of cathodic inhibitors may also be adversely affected by solution temperature and pH. Examples of typical cathodic inhibitors include zinc ions, polyphosphates and phosphonates. Cathodic inhibitors may be used individually or in combination with other cathodic and/or anodic inhibitors.

Limescale formation on heat transfer surfaces may also be controlled by chemical treatment of the feedwater. In the past, such treatment usually involved addition of strongly acidic compounds, such as sulfuric acid, to the feedwater, causing a shift in the solubility equilibrium away from formation of calcium carbonate.

The more common treatments in use today tend to focus on inhibiting either the nucleation or crystal growth stages of the scale formation process. For example, polymeric inorganic phosphates and phosphonates adsorb onto nuclei and growing limescale crystals, thus inhibiting both nucleation and crystal growth. Under certain conditions, however, the polyphosphates can hydrolyze to form phosphate ions, which decreases the inhibitory action of the additive as well as promoting the formation of insoluble calcium phosphate scale. Similarly, some phosphonates may be degraded to phosphate ions in aqueous solutions containing even low concentrations of chloride ions.

Organic polymers such as carboxylic acid polymers are also presently used to control scale formation. These polymers, for example polyacrylates, polymaleates and polymethacrylates, typically act as dispersants and prevent scale deposition by keeping small particles of scale in suspension. Many carboxylic acid polymers, however, exhibit dramatically reduced efficacy in water of high hardness, limiting their usefulness in systems where aqueous solutions become concentrated.

SUMMARY OF THE INVENTION

Accordingly, the present invention is directed to a composition that can inhibit both chloride-induced corrosion of and limescale formation on a ferrous metal or alloy which contacts an aqueous solution, even a solution of high hardness and chloride content, without the problems associated with conventional compositions and methods.

Additional features and advantages of the invention will be set forth in the description which follows, and in part will be apparent from the description or may be learned from practice of the invention. The advantages of the invention will be realized and attained by the composition particularly pointed out in the written description and claims.

To achieve these and other advantages and in accordance with the purpose of the invention, as embodied and broadly described, the invention provides a composition for inhibiting chloride-induced corrosion of and limescale formation on a ferrous metal or alloy, which contains a corrosion inhibiting amount of at least one polycarboxylic acid and/or its alkali metal or alkaline earth metal salts and a sufficient amount of a base to bring the aqueous solution to a pH effective to inhibit both chloride-induced corrosion and limescale formation.

There is also provided methods for inhibiting chloride-induced corrosion of and limescale formation on a ferrous metal or alloy which contacts an aqueous solution. In one embodiment, a corrosion inhibiting amount of at least one polycarboxylic acid and/or its alkali metal or alkaline earth metal salts and a base are added to an aqueous solution which contacts a ferrous metal or alloy. In an alternative embodiment, a corrosion inhibiting amount of at least one polycarboxylic acid and/or its alkali metal or alkaline earth metal salts and a base is applied to the surface of a ferrous metal or alloy.

It is to be understood that both the foregoing general description and the following detailed description are exemplary and explanatory and are intended to provide further explanation of the invention as claimed.

DETAILED DESCRIPTION OF THE INVENTION

A first embodiment of the present invention is directed to a composition which can inhibit limescale formation on and chloride-induced corrosion of a ferrous metal or alloy which contacts an aqueous solution, comprising at least one polycarboxylic acid and a sufficient amount of a base to bring the pH of the aqueous solution to a level at which chloride-induced corrosion and limescale formation are both inhibited. This composition is particularly useful for inhibiting limescale formation and chloride-induced corrosion in systems in which aqueous solutions are concentrated by rapid heating, such as flash heating systems.

The polycarboxylic acid, i.e., an acid having two or more carboxylic acid moieties, may be used as a free acid or in the form of an alkali metal or alkaline earth metal salt. Suitable polycarboxylic acids are available from commercial sources or can be prepared from available materials using the methods known to those skilled in the art.

In a preferred embodiment, the present composition contains a mixture of a polycarboxylic acid and the alkali metal or alkaline earth metal salt of that acid. Mixtures of more than one polycarboxylic acid and/or more than one alkali metal or alkaline earth metal salt may also be used in the inventive composition.

Preferably, the polycarboxylic acid is an organic dicarboxylic acid or organic tricarboxylic acid. More preferably, the polycarboxylic acid is a $C_3$–$C_8$ di- or tricarboxylic acid, which may be saturated or unsaturated. The di- or tricarboxylic acid may be unsubstituted or substituted, for example having one or more hydroxy groups. The polycarboxylic acid may also be an aromatic di- or tricarboxylic acid.

Illustrative examples of such polycarboxylic acids which are suitable for use in the present invention include citric acid, malonic acid, succinic acid, glutaric acid, adipic acid, pimelic acid, suberic acid, tartaric acid, malic acid, isophthalic acid, terephthalic acid and fumaric acid. Preferably, the polycarboxylic acid is a nontoxic food-grade acid. Most preferably, the polycarboxylic acid is citric acid.

The polycarboxylic acids used in the present invention may be employed as free acids or as their alkali metal or alkaline earth metal salts or as mixtures of free acid(s) and/or salt(s). Cations which form suitable alkali metal salts for use in the present composition include sodium and potassium. Examples of suitable alkaline earth metals include calcium and magnesium.

The polycarboxylic acid is used in any amount that will effectively inhibit chloride-induced corrosion. One skilled in the art can readily determine a suitable amount of acid by either panel testing or enclosure testing. Preferably, when citric acid and/or an alkali metal or alkaline earth metal salt of citric acid is used, the amount of acid and/or salts employed is sufficient to provide at least 2000 parts per million of total citrate.

The composition of the present invention further contains an amount of a base sufficient to bring the pH of the aqueous solution to a level where both limescale formation and corrosive attacks are inhibited. Preferably, the amount of base is sufficient to bring the pH of the aqueous solution to from about 3 to about 10. More preferably, the amount of base is sufficient to bring the pH of the aqueous solution to from about 4 to about 5. In certain embodiments of the present invention, i.e., when the polycarboxylic acid or salt or mixtures thereof alone provides an aqueous solution having a pH effective for inhibition, addition of a base will not be necessary.

Bases suitable for use in the present invention include any source of alkalinity sufficient to bring the pH of the aqueous solution to the requisite level for inhibiting limescale formation and corrosive attacks. Both inorganic and organic bases, or mixtures of such bases, may be used in the inventive composition. Illustrative examples of bases suitable for use in the present invention include sodium hydroxide, potassium hydroxide, sodium carbonate and potassium carbonate.

The inventive composition is useful in methods for inhibiting chloride-induced corrosion of and limescale formation on ferrous metals and alloys which contact aqueous solutions. For example, the inventive composition may be used to inhibit chloride-induced corrosion and limescale formation on surfaces of ferrous metals and alloys in process systems in which aqueous solutions are concentrated at high temperatures, such as flash heating systems.

In a first preferred embodiment of the inventive method, a composition according to the present invention is added directly or indirectly to the aqueous solution which contacts the ferrous metal or alloy. According to this embodiment, the ingredients of the composition may be added separately to the aqueous solution, or admixed prior to addition to the aqueous solution. Moreover, the ingredients of the inventive composition may be admixed with other suitable additives and ingredients known to the art prior to or after addition to the aqueous solution.

In a second preferred embodiment of the inventive method, a composition according to the present invention is applied to the surface of a ferrous metal or alloy which contacts an aqueous solution. The composition may be applied directly to the surface of a ferrous metal or alloy, for example, by preparing a solution or suspension of the inventive composition and then spraying that solution or suspension on the surface of the ferrous metal or alloy. In the alternative, separate solutions or suspensions of the constituents of the inventive composition may be prepared and then applied simultaneously or successively to the surface of a ferrous metal or alloy.

The inventive composition may be employed in any form suitable for its intended use, such as a dry powder or aqueous solution. Selection of a particular form will depend upon the particular intended application of the inventive composition. A dry powder of the admixed ingredients of the inventive composition is particularly preferred.

The inventive composition may also contain any of the inert additives, diluents and excipients known to the art for use in compositions of this type. For example, when the inventive composition is to be added directly to an aqueous solution, the composition may contain a surfactant to facilitate wetting and dissolution of the active ingredients in the aqueous solution or an antimicrobial agent to inhibit the growth of microorganisms in the solution.

The following examples of the inventive composition are merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

| SAMPLE COMPOSITIONS | |
|---|---|
| SAMPLE NO. 1 | |
| citric acid | 70 wt % |
| sodium carbonate | 30 wt % |
| SAMPLE NO. 2 | |
| citric acid | 40 wt % |
| trisodium citrate | 60 wt % |
| SAMPLE NO. 3 | |
| citric acid | 75 wt % |
| sodium hydroxide | 25 wt % |

Corrosion Inhibitor Evaluation Procedures

A. Panel Testing (a) Passivate two 3"×6" stainless steel 304 or 316 panels by immersion in 20% nitric acid at 60° C. for 30 minutes.

(b) Prepare 1 L of control water by artificially hardening 1 L of deionized water to 150 ppm hardness as calcium carbonate ($CaCO_3$), using a 2:1 Ca:Mg stock solution. Add 100 ppm chloride to the control water.

(c) Prepare 500 mL of test water by adding the desired amount of the corrosion inhibitor system to 500 mL of the control water.

(d) Place 500 mL of test water in a 500 mL separatory funnel equipped with a Rotoflo™ stopcock. Repeat for control water.

(e) Suspend each separatory funnel so that the tip of the funnel is 6" above an adjustable hot plate.

(f) Place each panel (test and control) on the appropriate hot plate and preheat to approximately 375° F. Monitor panel temperatures with a standard thermocouple.

(g) Adjust the stopcock on each funnel so that one drop is discharged every 8–12 seconds.

(h) For each setup, make slight adjustments to temperature and drip rate such that each drop completely vaporizes within 2 seconds of contacting panel. Do not allow panels to become too hot (>400° F.) or the drop will not vaporize evenly.

(i) Expose each panel to 500 mL of its respective solution, monitoring drip rate and panel temperature periodically. Make adjustments as necessary to ensure proper flash vaporization of each drop.

(j) Corrosion is easily detected by microscopic evaluation at 50× magnification. Inhibition may be judged quantitatively by comparison of the number of pitting corrosion sites on the flash area of the test and control panels.

B. Enclosure Testing

A suitable enclosure for this type of testing consists of a reservoir and an enclosed cabinet fitted with a heating element, a water delivery mechanism, and the appropriate control elements. A panel of the appropriate metal or alloy is placed on the heater and held at approximately 375° F. The water delivery mechanism is arranged so that controlled amounts of water are transported from the reservoir to the surface of the test panel at regular intervals. The controls should regulate water delivery and panel temperature such that each portion delivered vaporizes completely on the panel within 2–3 seconds.

(a) Treat one gallon of deionized water with the desired levels of hardness and chloride.

(b) Add the desired amount of the corrosion inhibitor system to the gallon of water.

(c) Fill reservoir of test exposure cabinet with test water. Calibrate cabinet to provide proper temperature and relative humidity.

(d) Fill reservoir of control exposure cabinet with deionized water prepared as in (a) above. Calibrate cabinet to provide proper temperature and relative humidity.

(e) Operate exposure cabinets for 25 hours, monitoring visually for limescale deposition and corrosion. An ammonium thiocyanate spot test for iron may be used to confirm the presence of corrosion.

(f) Cabinet reservoirs should be refilled with test or control water as needed during the test period.

The efficacy of each of the acids included in the following Table was tested according to one or both of these procedures.

| COMMON NAME | ACID CLASSIFICATION | MW | pKa1 | pKa2 |
|---|---|---|---|---|
| Tartaric Acid | C4-Dicarboxylic, two hydroxy group | 183.1 | 3.22 | 4.82 |
| Glutaric Acid | C5-Dicarboxylic | 132.1 | 4.31 | 5.41 |
| Adipic Acid | C6-Dicarboxylic | 146.1 | 4.43 | 5.41 |
| Pimelic Acid | C7-Dicarboxylic | 160.2 | 4.48 | 5.42 |
| Malonic Acid | C3-Dicarboxylic | 104.1 | 2.83 | 5.69 |

-continued

| COMMON NAME | ACID CLASSIFICATION | MW | pKa1 | pKa2 |
|---|---|---|---|---|
| Fumaric Acid | C4-Unsaturated dicarboxylic trans | 116.1 | 3.03 | 4.44 |
| Isophthalic Acid | Meta-dicarboxylic aromatic | 166.1 | 3.54 | 4.60 |
| Terephthalic Acid | Para-dicarboxylic aromatic | 166.1 | 3.51 | 4.82 |
| Succinic Acid | C4-Dicarboxylic | 118.1 | 4.16 | 5.61 |
| Malic Acid | C4-Dicarboxylic, one hydroxy group | 116.1 | 3.40 | 5.11 |
| Suberic Acid | C8-Dicarboxylic | 174.2 | 4.51 | 5.40 |

Although preferred embodiments of the invention are described herein in detail, it will be understood by those skilled in the art that variations may be made thereto without departing from the spirit of the invention or the scope of the appended claims.

What is claimed is:

1. A method of inhibiting chloride induced corrosion of and limescale formation on a ferrous metal or alloy surface of a flash heating system comprising contacting said surface with an aqueous solution, which consists essentially of at least one polycarboxylic acid and/or its alkali metal or alkaline earth metal salts and a sufficient amount of a base to bring said aqueous solution to a pH of from about 3 to about 10.

2. The method according to claim 1, wherein said polycarboxylic acid is in the form of an alkali metal or alkaline earth metal salt.

3. The method according to claim 1, wherein said polycarboxylic acid is a mixture of a polycarboxylic acid and its alkali metal or alkaline earth metal salt.

4. The method according to claim 1, wherein said polycarboxylic acid is citric acid, malonic acid, succinic acid, glutaric acid, adipic acid, pimelic acid, suberic acid, tartaric acid, malic acid, isophthalic acid, terephthalic acid or fumaric acid.

5. The method according to claim 1, wherein said polycarboxylic acid is citric acid.

6. The method according to claim 1, wherein said polycarboxylic acid is a mixture of citric acid and trisodium citrate.

7. The method according to claim 1, wherein the amount of said base is sufficient to bring the pH of said aqueous solution to about 4 to about 5.

8. The method according to claim 1, wherein said base is sodium hydroxide, potassium hydroxide, sodium carbonate or potassium carbonate.

9. The method according to claim 1, wherein said polycarboxylic acid is a $C_3$–$C_8$ di- or tricarboxylic acid, which may be substituted or unsubstituted, saturated or unsaturated.

* * * * *

UNITED STATES PATENT AND TRADEMARK OFFICE
CERTIFICATE OF CORRECTION

PATENT NO.: 6,042,742
DATED: March 28, 2000
INVENTOR(S): Michael WITTEMORE et al.

It is certified that an error appears in the above-identified patent and that said Letters Patent is hereby corrected as shown below:

Claim 7, col. 8, line 46, after "solution to" add --a pH of--.

Signed and Sealed this

Twenty-seventh Day of February, 2001

*Attest:*

NICHOLAS P. GODICI

*Attesting Officer*   *Acting Director of the United States Patent and Trademark Office*